(12) United States Patent
Asadi et al.

(10) Patent No.: US 12,325,035 B2
(45) Date of Patent: Jun. 10, 2025

(54) SURFACE-COATING ROBOT OPERATING SYSTEM AND METHOD THEREOF

(71) Applicants: I-Ming Chen, Taipei (TW); Ehsan Asadi, Esfahan (IR)

(72) Inventors: Ehsan Asadi, Singapore (SG); I-Ming Chen, Singapore (SG)

(73) Assignees: I-Ming Chen, Taipei (TW); Ehsan Asadi, Esfahan (IR)

( * ) Notice: Subject to any disclaimer, the term of this patent is extended or adjusted under 35 U.S.C. 154(b) by 1057 days.

(21) Appl. No.: 17/233,647

(22) Filed: Apr. 19, 2021

(65) Prior Publication Data

US 2021/0308710 A1 Oct. 7, 2021

Related U.S. Application Data

(63) Continuation of application No. PCT/CN2018/111723, filed on Oct. 24, 2018.

(30) Foreign Application Priority Data

Oct. 19, 2018 (CN) .......................... 201811224196.7

(51) Int. Cl.
*B05B 12/00* (2018.01)
*B05B 12/12* (2006.01)
(Continued)

(52) U.S. Cl.
CPC ........ *B05B 13/0431* (2013.01); *B05B 12/004* (2013.01); *B05B 12/122* (2013.01);
(Continued)

(58) Field of Classification Search
None
See application file for complete search history.

(56) References Cited

U.S. PATENT DOCUMENTS 3,592,387 A * 7/1971 Pilott .................... B05B 13/041
239/752
4,881,561 A * 11/1989 Schwarzwalder .... B05B 15/555
134/76

(Continued)

FOREIGN PATENT DOCUMENTS

| CN | 108160384 A | 6/2018 |
|---|---|---|
| CN | 108246543 A | 7/2018 |
| CN | 108605508 A | 10/2018 |

*Primary Examiner* — Binu Thomas

(57) ABSTRACT

Disclosed is an surface-coating robot operating system, a movable base (100) is provided to drive the whole operating system to implement autonomous navigation movement in the workspace; a vertical linear actuator (200) is used to drive a mechanical arm (300) to move up and down so as to meet the requirement for spraying at different heights; and the mechanical arm (300) is used to drive a spray gun (400) to implement multi-degree-of-freedom motion so as to meet the requirement for spraying at different positions; the whole spraying process is autonomously completed by the operating system, which is time-saving and labor-saving, high efficient, and ensures uniform spraying thickness, smooth spraying surface and consistent spraying quality; the robotic spraying may obviously reduce the coating dusts generated in a spraying process and the human risk caused by exposure to harmful coating chemicals. An operating method for surface-coating robot is disclosed.

12 Claims, 6 Drawing Sheets

(51) Int. Cl.
    *B05B 13/00*          (2006.01)
    *B05B 13/04*          (2006.01)
    *B05B 15/55*          (2018.01)
    *B05B 15/68*          (2018.01)
    *B25J 11/00*          (2006.01)
    *B25J 19/02*          (2006.01)

(52) U.S. Cl.
    CPC ............ *B05B 13/005* (2013.01); *B05B 15/55* (2018.02); *B05B 15/68* (2018.02); *B25J 11/0075* (2013.01); *B25J 19/021* (2013.01)

(56) References Cited

U.S. PATENT DOCUMENTS

| | | | | |
|---|---|---|---|---|
| 5,358,568 A * | 10/1994 | Okano | ................ | B05B 13/0431 |
| | | | | 118/712 |
| 6,789,755 B1 * | 9/2004 | Mack | ................ | B05B 13/0431 |
| | | | | 239/587.5 |
| 2015/0375390 A1 * | 12/2015 | Becroft | .............. | B05B 13/0431 |
| | | | | 901/41 |
| 2017/0095828 A1 * | 4/2017 | Ripley | ................. | B05B 13/005 |
| 2018/0169685 A1 * | 6/2018 | Taylor | ................ | B05B 13/0431 |
| 2019/0093373 A1 * | 3/2019 | Telleria | ............... | B05B 13/0431 |
| 2019/0255551 A1 * | 8/2019 | Hargadon | ........... | B05B 13/0431 |
| 2019/0374966 A1 * | 12/2019 | Thompson | ............ | B05B 13/005 |
| 2019/0381529 A1 * | 12/2019 | Schaumberger | ...... | B05B 13/005 |

* cited by examiner

SURFACE-COATING ROBOT OPERATING SYSTEM AND METHOD THEREOF

CROSS REFERENCE TO RELATED APPLICATIONS

The present application is a Continuation Application of PCT application No. PCT/CN2018/111723 filed on Oct. 24, 2018, which claims the benefit of Chinese Patent Application No. 201811224196.7 filed on Oct. 19, 2018. The contents of the above-identified applications are hereby incorporated by reference.

FIELD OF THE DISCLOSURE

The present disclosure relates to the field of surface-coating automatous operating, in particular to a surface-coating robot operating system and method thereof.

BACKGROUND

At present, the surface-coating operation of building walls, furniture and the like still depends on manual implementation, so there are the problems of low operation efficiency, uneven quality and the like. Conventional coating is typically done manually using a coating roller or coating sprayer. Coating with a coating roller typically requires the depositing of two or more layers of coating, which is not only time consuming but also labor intensive, and it also tends to show brush-marks. The method for quickly coating the single-sided coating by adopting the sprayer (generally a spray gun) has the advantages of smooth coating, no brush mark/rolling mark and the like. However, manual spraying still faces the following problems: firstly, the skill, experience and operation level of workers determine the spraying efficiency and quality, and the consistency cannot be ensured; the distance and included angle between the spray gun and the target surface, the moving speed of the spray gun, the amount of coating spraying, the attachment conversion rate and the like all influence the spraying efficiency and quality, and manual work cannot carry out quantitative control fundamentally; secondly, generally, it has to be constructed by means of carrying tools such as scaffolds and the like for the areas with the height of more than two meters, which maybe inevitably cause low construction efficiency because of building, disassembling and moving the carrying tools, and also there is risk of workers falling; thirdly, the workers have to be exposed to hazardous chemicals during coating operation, which brings a significant health risk.

Therefore, the existing surface-coating operation technology is to be improved and developed. The adoption of the related robot techniques for automatous operation is an ideal solution to the above problems.

SUMMARY OF THE DISCLOSURE

The present disclosure provides a surface-coating robot operating system and method thereof, aiming to solve the problems that a coating roller and coating sprayer relies on manual operations, which is time consuming, labor intensive, inefficient and unstable quality.

The technical solution of the present disclosure is as follows:
a movable base for supporting the whole surface-coating robot operating system and implementing movement;
a vertical linear actuator structure provided on the movable base;
a mechanical arm provided on the vertical linear actuator structure and able to move up and down along the vertical linear actuator structure, a spray gun is provided on the mechanical arm, and the spray gun is connected with coating;
a controller provided in the movable base, and the controller controls the automatic operation of the whole surface-coating robot operating system;
the movable base, the vertical linear actuator structure, the mechanical arm and the spray gun is all connected with the controller and controlled by the controller: the movable base drives the whole surface-coating robot operating system to implement autonomous navigation movement in a working space: the vertical linear actuator structure drives the mechanical arm to move up and down according to the height of a spraying position so as to ensure the working area of the spray gun; and the mechanical arm drives the spray gun to implement multi-degree-of-freedom motion so that the spray gun may always perform coating operation at the optimal operation posture.

The surface-coating robot operating system, wherein, the movable base comprising a pedestal, a support provided on the pedestal and moving wheels set beneath the bottom of the pedestal, a power unit provided on the pedestal: the power unit is connected with the controller, the power output end of the power unit is connected with the moving wheels so as to drive the moving wheels to realize that the surface-coating robot operating system is movable and steerable in the plane: the vertical linear actuator structure provided on the pedestal; a coating reservoir, a circulation booster all provided in the support.

The surface-coating robot operating system, wherein, a 2D (two-dimensional) laser scanner is provided on the top of the movable base, the 2D laser scanner is used for measuring the distance and the direction between surface-coating robot operating system and the area to be sprayed: the 2D laser scanner is connected with the controller: in the moving process of the surface-coating robot operating system, the 2D laser scanner measures the distance and the direction between the surface-coating robot operating system and the area to be sprayed in real time and feeds the measured information back to the controller; and the controller controls the power unit to drive the surface-coating robot operating system to move to the optimal distance and direction with respect to the area to be sprayed according to the feedback information so as to perform coating operation.

The surface-coating robot operating system, wherein, the vertical linear actuator structure comprising a vertical linear actuator and a lifting motor: the vertical linear actuator comprising a ball screw vertically provided on the movable base, a bracket and a nut provided on the ball screw: the nut and the bracket are fixedly connected and moves up and down along with the rotation of the ball screw; the mechanical arm is provided on the top of the bracket; the lifting motor is connected with the ball screw to drive the ball screw to rotate; and the lifting motor is connected with the controller.

The surface-coating robot operating system, wherein, the mechanical arm is a six-axis joint mechanical arm or a seven-axis joint mechanical arm: a base of the mechanical arm is fixed on the vertical linear actuator structure; and the spray gun is provided at the tail end of the mechanical arm.

The surface-coating robot operating system, wherein, further comprising: a coating reservoir for storing coating and a circulation booster for circularly transporting the coating stored in the coating reservoir to the spray gun in a pressurizing manner: the coating reservoir, the circulation booster are all provided in the movable base: the coating reservoir for storing the coating utilizes a coating storage tank, and the spray gun utilizes a multi-chamber airless spray gun: at least one coating storage tank is provided, and at least one circulation booster is provided; both the circulation booster and the multi-chamber airless spray gun are connected with the controller; the circulation booster are connected with the coating storage tank, the circulation booster are connected with the multi-chamber airless spray gun; the controller controls the circulation booster to activate and connect the corresponding coating storage tank; and the controller controls the multi-chamber airless spray gun to open the corresponding chamber to meet the different requirements of spraying.

The surface-coating robot operating system, wherein, the coating storage tank is stored with clear water: the movable base is provided with ultrasonic vibrator, the movable base is provided with a first clean groove and a second clean groove, the first clean groove is connected with the ultrasonic vibrator, and the first clean groove is equipped with clear water; the ultrasonic vibrator is connected with the controller: prior to the spray gun performing spraying or posterior to the spraying, the mechanical arm is controlled to drive the spray gun to extend into the second clean groove, the circulation booster makes the clear water stored in the coating storage tank reaching the spray gun to clean the interior of the spray gun, and the waste water after cleaning is collected by the second clean groove; and then, the mechanical arm is controlled to drive the spray gun to move into the first clean groove and start the ultrasonic vibrator to clean the exterior of the spray gun by cooperating with clean water in the first clean groove.

The surface-coating robot operating system, wherein, further comprising: a first 3D (three-dimensional) camera, a second 3D camera and absolute encoder, the first 3D camera is provided on the bracket, and the second 3D camera is provided on the top of movable base at a certain inclination angle, the first 3D camera, the second 3D camera and the absolute encoder are all connected with the controller: the first 3D camera captures local 3D data of the area to be sprayed when moving up and down along with the bracket and feeds the data back to the controller; and the absolute encoder acquires corresponding reading of the lifting motor and feeds the reading back to the controller; the second 3D camera captures the 3D data of the top of the area to be sprayed, the crossing angle between the area to be sprayed and the top boundary at a certain inclination angle and feeds the 3D data back to the controller; and the controller processes the received data to generate an operation track and controls the spray gun to perform spraying operation.

A spraying method of the surface-coating robot operating system comprising the following steps:
S1, the surface-coating robot operating system moving to an optimal position with respect to an area to be sprayed, and parking still;
S2, the vertical linear actuator structure driving the mechanical arm and the spray gun to move up and down; the first 3D camera moving up and down along with the bracket to capture local 3D data of an area to be sprayed and feeding the local 3D data back to the controller; the absolute encoder acquiring corresponding reading of the lifting motor and feeding back the reading to the controller; and the second 3D camera capturing the 3D data of the top of the area to be sprayed, the crossing angle between the area to be sprayed and the top boundary at a certain inclination angle and feeding the 3D data back to the controller;
S3, the controller processing the received data to generate an operation track; and
S4, the controller driving the mechanical arm and the spray gun to perform spraying operation on the area to be sprayed according to the generated operation track.

The spraying method of the surface-coating robot operating system, wherein, in the step S4, the spraying operating process of the mechanical arm and the spray gun is as follows:
dividing an area to be sprayed into a plurality of spraying pieces from top to bottom, and the spray gun performing a spraying sequence from top to bottom: the spray gun generating a horizontal spraying strip when it spraying from left to right each time, and a spraying piece being formed when a certain number of horizontal spraying strips being provided in sequence from top to bottom: when the spray gun finishes the spraying of one spraying piece, the vertical linear actuator structure driving the spray gun to move down and continuing to implement the spraying of the next spraying piece until the spraying of the whole area to be sprayed being completed.

The present disclosure has the advantages that: the present disclosure provides a surface-coating robot operating system and method thereof, wherein a movable base is set to drive the whole surface-coating robot system to implement autonomous navigation movement in a working space: a vertical linear actuator is used for driving the mechanical arm to move up and down so as to meet the spraying operation requirements of different heights: a spray gun is driven by the mechanical arm to realize multi-degree-of-freedom operation angle and position adjustment to meet the requirements of different spraying positions: the whole spraying process is automatically implemented by the surface-coating robot operating system, which not only reduces time and effort, but also being of high efficiency obtaining coating of uniform thickness and smooth surface, such that the consistency of the spraying quality is guaranteed by the system; it will significantly reduce the coating dust generated in the spraying process and the risk of workers' exposure to the harmful coating chemicals.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

Figure 1:
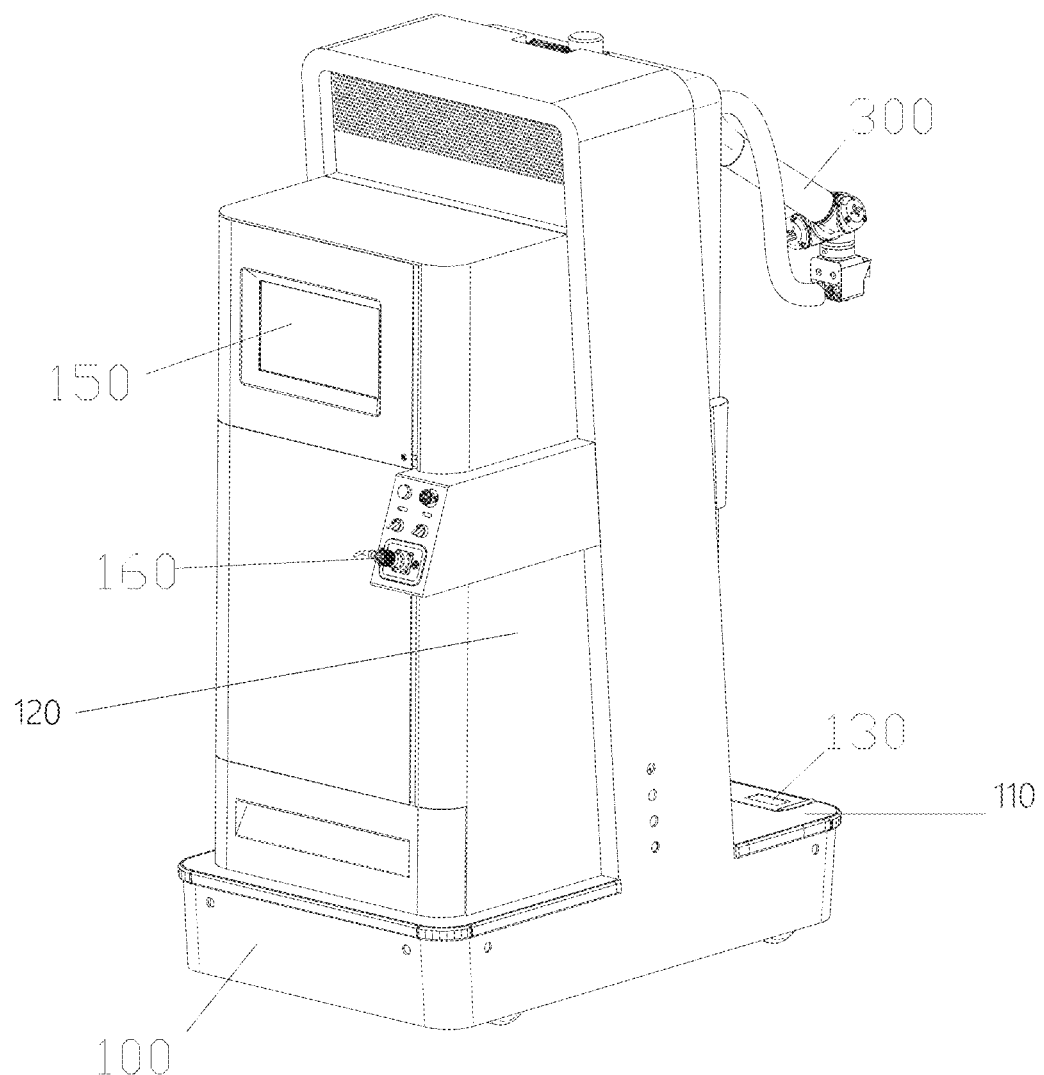
FIG. 1 is a structural schematic view of a surface-coating robot operating system according to the present disclosure.
Figure 2:
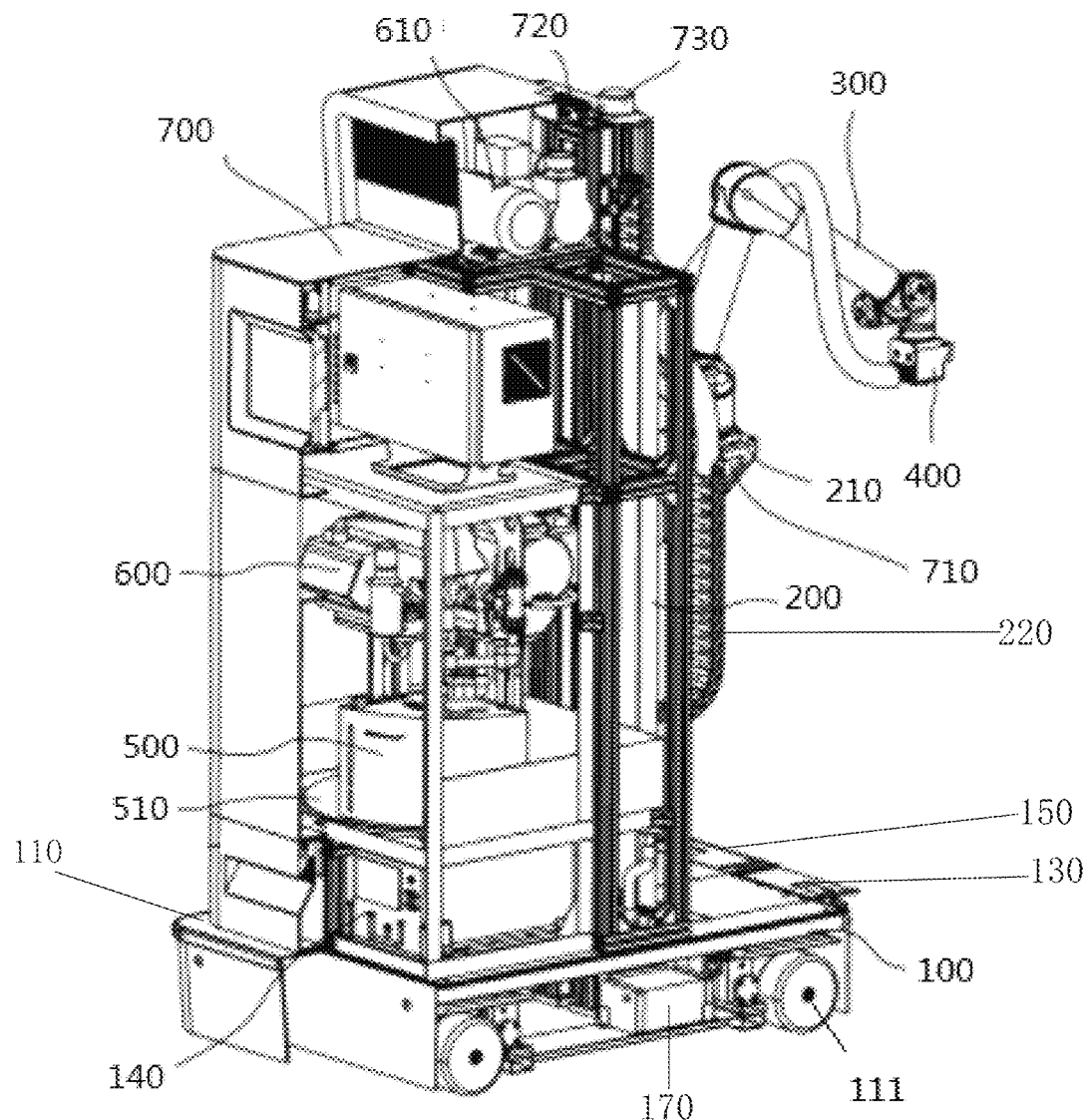
FIG. 2 is an internal structure view of a surface-coating robot operating system according to the present disclosure.
Figure 3:
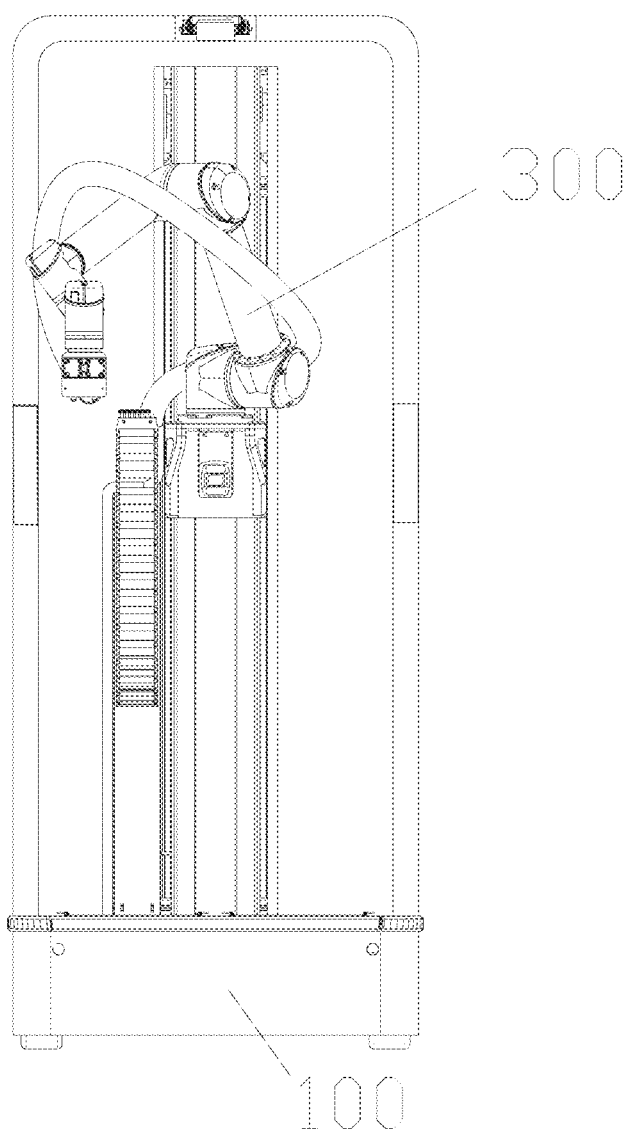
FIG. 3 is a front view of a surface-coating robot operating system according to the present disclosure.
Figure 4:
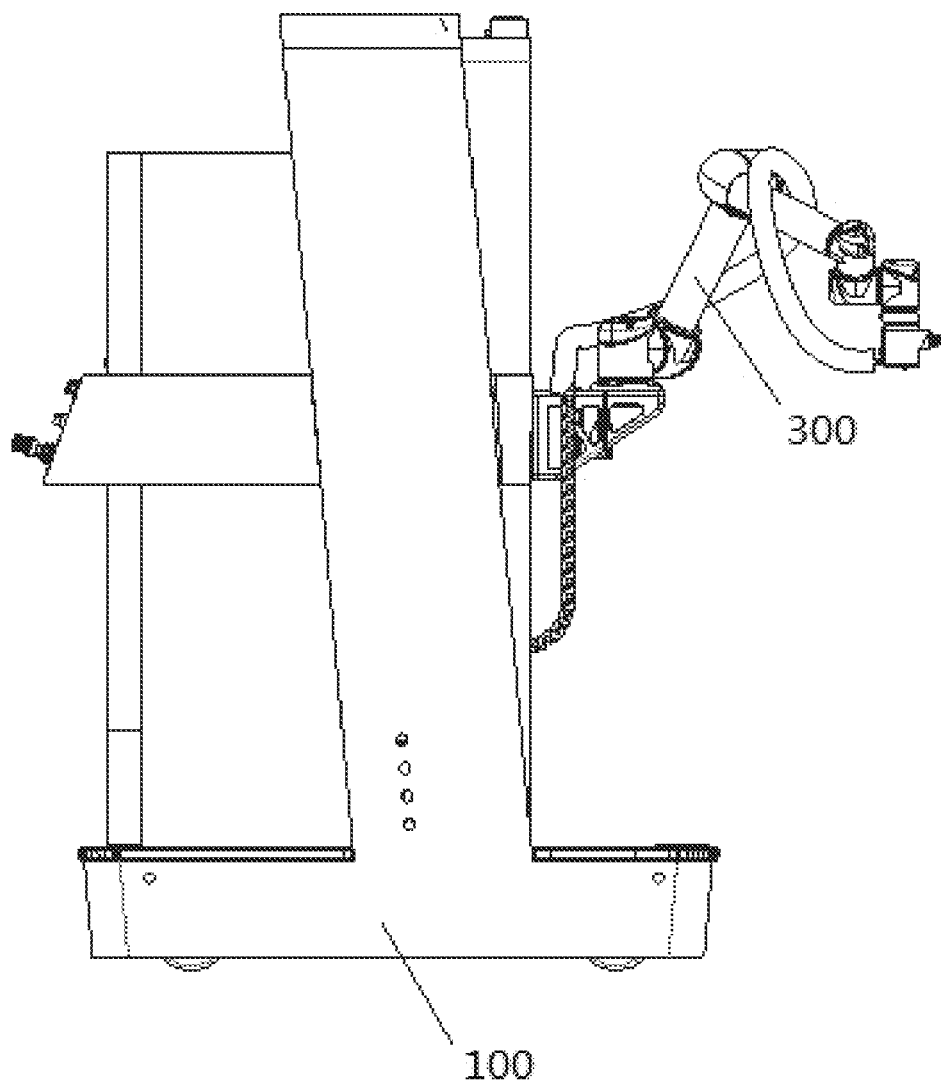
FIG. 4 is a side view of a surface-coating robot operating system according to the present disclosure.
Figure 5:
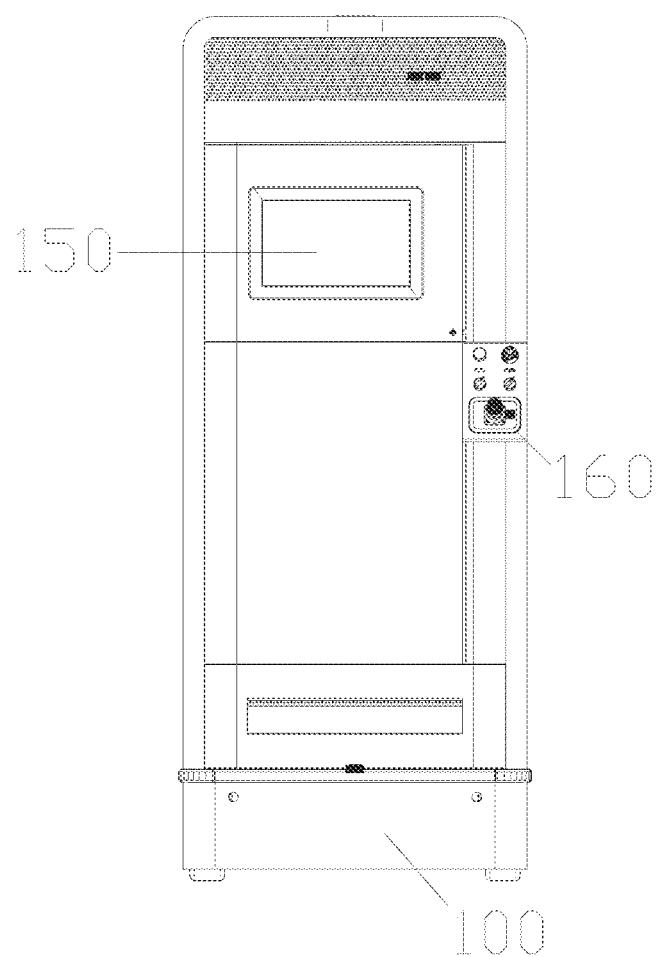
FIG. 5 is a rear view of the surface-coating robot operating system according to the present disclosure.

Reference will now be made in detail to embodiments of the present disclosure, implements of which are illustrated in the accompanying drawings, wherein like reference numerals refer to the same or similar elements or elements having the same or similar functions throughout the whole text. The embodiments described below with reference to the accompanying drawings are illustrative only for the purpose of explaining the present disclosure and are not to be construed as limiting the present disclosure.

In the description of the present disclosure, it is to be understood that the terms "center", "longitudinal", "lateral", "length", "width", "thickness", "upper", "lower", "front", "rear", "left", "right", "vertical", "horizontal", "top", "bottom", "interior", "exterior", "clockwise", "counterclockwise" and the like, indicate orientations or positional relationships based on those shown in the drawings, merely for easy description and simplification of the description, and do not indicate or imply that the device or element referred to has a particular orientation, be constructed in a particular orientation, and be operated, and thus, the terms are not to be construed as limiting the present disclosure. Furthermore, the terms "first" and "second" are used for descriptive purposes only and are not to be construed as indicating or implying relative importance or to implicitly indicate the number of technical features indicated. Thus, features defined as "first" and "second" may explicitly or implicitly include one or more of the described features. In the description of the present disclosure, "a plurality" means two or more unless specifically defined otherwise.

In the description of the present disclosure, it should be noted that, unless otherwise explicitly specified or limited, the terms "mounted," "linked," and "connected" are to be construed broadly and the may be, for example, fixedly connected, detachably connected, or integrally connected: the terms may be mechanically connected, electrically connected or may be in communication with each other; they may be directly connected or indirectly connected through intervening media, or may be connected through two elements or the interaction of two elements. The specific meanings of the above terms in the present disclosure can be understood according to specific situations by those of ordinary skill in the art.

In the present disclosure, unless otherwise explicitly specified or limited, the recitation of a first feature "on" or "under" a second feature may include the recitation of the first and second features being in direct contact, and may also include the recitation that the first and second features are not in direct contact, but are in contact via another feature between them. Also, the first feature "on," "above" and "over" the second feature may include the first feature being directly above and obliquely above the second feature, or simply indicating that the first feature is at a higher level than the second feature. a first feature "below," "under" and "beneath" a second feature comprising the first feature being directly beneath and obliquely beneath the second feature, or simply indicating that the first feature is at a lesser level height than the second feature.

The following disclosure provides many different embodiments or examples for implementing different features of the disclosure. To simplify the disclosure of the present disclosure, specific example components and arrangements are described below. Of course, they are merely examples and are not intended to limit the present disclosure. Moreover, the present disclosure may repeat reference numerals and/or reference letters in the various examples, which have been repeated for purposes of simplicity and clarity and in themselves do not dictate a relationship between the various embodiments and/or configurations discussed. In addition, the present disclosure provides examples of various specific processes and materials, but those ordinary skilled in the art will recognize the application of other processes and/or the use of other materials.

As shown in FIGS. 1 to 5, a surface-coating robot operating system is suitable for comprising but not limited to automatic spraying of furniture, houses, office buildings and industrial plants, and suitable coatings comprise but not limited to paints, degreased coating, gypsum, concrete, water (cleaning operation), and which comprising:

a movable base 100 for supporting and driving the whole surface-coating robot operating system to move;

a vertical linear actuator structure 200 provided on the movable base 100;

a mechanical arm 300 provided on the vertical linear actuator structure 200 and vertically moved up and down along the vertical linear actuator structure 200, the mechanical arm 300 being provided with a spray gun 400;

a coating reservoir 500 for storing coating, the coating reservoir 500 being provided on the movable base 100;

a circulation booster 600 for circularly transporting the coating stored in the coating reservoir 500 in a pressurizing manner, the circulation booster 600 being provided on the movable base 100;

a controller 700 for controlling the automatic operation of the whole surface-coating robot operating system, the controller 700 being provided in the movable base 100;

the motion base 100, the vertical linear actuator structure 200, the mechanical arm 300, the spray gun 400 and the circulation booster 600 are all connected with the controller 700, and are controlled by the controller 700 for operation: the movable base 100 drives the whole surface-coating robot operating system to implement autonomous navigation movement in a working space, the vertical linear actuator structure 200 drives the mechanical arm 300 to move up and down according to the height of the spraying position so as to ensure the working area of the spray gun 400, the mechanical arm 300 drives the spray gun 400 to implement multi-degree-of-freedom movement so that the spray gun 400 performs coating operation at the optimal operation posture all the time, the circulation booster 600 pressurizes and circularly transports the coating in the coating reservoir 500 to the spray gun 400 to realize coating through the spray gun 400.

Specifically, the movable base 100 comprises a pedestal, a support provided on the pedestal, and moving wheels 111 set beneath the bottom of the pedestal, a power unit (such as a motor) is provided on the pedestal, the power unit is connected to the controller 700, and a power output end of the power unit is connected to the moving wheels 111 so as to drive the moving wheels 111 to implement the movement and steering of the surface-coating robot operating system in a plane, the vertical linear actuator structure 200 is provided on the pedestal, and the coating reservoir 500, the circulation booster 600 are provided in the support: according to the spraying requirement, the controller 700 controls the power unit to drive the moving wheels 111 to move, so that the surface-coating robot operating system moves to the area to be sprayed, the surface-coating robot operating system is parked at the optimal orientation and position with respect to the area to be sprayed so as to perform the spraying operation.

In order to avoid that the surface-coating robot operating system touching the obstacle during the moving process, two distance measuring meters for detecting the distance are set between the surface-coating robot operating system and the obstacle respectively provided on four lateral-side surfaces (i.e. eight distance measuring meters in total) of the movable base 100, and the distance measuring meters are connected with the controller 700: when the distance between the obstacle and the surface-coating robot operating system is smaller than the predetermined values, the distance measuring meter feeds back information to the controller 700, and the controller 700 controls the surface-coating robot operating system to avoiding hitting the obstacle.

Preferably, in order to increase movement stability of the movable base 100, the moving wheels 111 is set at the bottom of the base through a suspension system, and the suspension system ensures the stable contact of the moving wheels 111 with the ground. In this embodiment, the moving wheels 111 may be mecanum wheels or omnidirectional wheels.

Further, in order to prevent the movable base 100 from moving due to external force during the spraying process and affecting the spraying effect, an automatic mechanical lock for locking the moving wheels 111 is set at the bottom of the base, the automatic mechanical lock is connected to the controller 700, and the controller 700 controls the automatic mechanical lock to lock or unlock the moving wheels 111: the surface-coating robot operating system is controlled to move to be parked at an optimal distance and direction with respect to the wall and perform spraying operation safely by the automatic mechanical lock locking the moving wheels 111.

In order to achieve precise movement of the surface-coating robot operating system, a 2D laser scanner 730 for measuring the distance and the direction between the surface-coating robot operating system and the area to be sprayed is provided on the top of the movable base 100, and the 2D laser scanner 730 is connected to the controller 700: in the moving process of the surface-coating robot operating system, the 2D laser scanner 730 measures the distance and direction between the surface-coating robot operating system and the area to be sprayed in real time, and feeds the measured information back to the controller 700, and the controller 700 controls the power unit to drive the surface-coating robot operating system to move to the area to be sprayed, so that the surface-coating robot operating system is parked at the optimal direction and position with respect to the area to be sprayed so as to perform spraying operation.

Further, in order to protect the devices provided on the pedestal and the support, the movable base 100 further comprises a housing extending upward from the top surface of the pedestal to the top surface of the support, and the housing covers the support, so as to prevent the devices provided on the pedestal and the support from being damaged and prolong the service life of the devices.

Specifically, the vertical linear actuator structure 200 comprises a vertical linear actuator and a lifting motor, the vertical linear actuator comprises a ball screw vertically provided on the pedestal, a bracket 210 and a nut provided on the ball screw, the nut is fixedly connected to the bracket 210 and moves up-and-down along with rotation of the ball screw; and a mechanical arm 300 provided on the top of the bracket 210, and the lifting motor is connected with the ball screw to drive the ball screw to rotate, and the lifting motor is connected to the controller 700. The bracket 210 may load with various heavy mechanical arms; driven by the lifting motor, the mechanical arm 300 can move up and down in a large distance vertical stroke from 450 mm to 1950 mm (1500 mm in total) away from the ground.

Further, in order to prevent the up-and-down movement of the mechanical arm 300 during the spraying process of the spray gun 400, which affects the spraying quality, the vertical linear actuator structure 200 further comprises an electromechanical lock for locking the vertical position of the bracket 210, and the electromechanical lock is connected to the controller 700.

Specifically, the mechanical arm 300 is a six-axis joint mechanical arm or a seven-axis joint mechanical arm, the base of the mechanical arm 300 is fixed on the bracket 210, and the spray gun 400 is set at the tail end of the mechanical arm 300.

Specifically, the coating reservoir 500 for storing coating utilizes a coating storage tank provided on the support.

Wherein, the number of the coating storage tanks can be determined according to actual requirements, and the number of the circulation boosters 600 can be determined according to actual requirements. In this embodiment, in order to meet the spraying requirement, four coating storage tanks are provided, two circulation boosters 600 are provided, the spray gun 400 is a multi-chamber airless spray gun, two circulation boosters 600 are connected with the multi-chamber airless spray gun, and one or more coating storage tanks are selected to be connected with the two circulation boosters 600 according to requirements.

Further, if the coating stored in the coating storage tank is liquid coating, a liquid level sensor is provided in the coating storage tank, and the liquid level sensor is connected to the controller 700: the liquid level sensor detects the remaining amount of the liquid coating in the coating storage tank in real time and feeds back information to the controller 700 for activating an alarm or sending a message to a supervisory system to inform an operator.

The circulation booster 600 utilizes a booster pump, and two booster pumps select one or more coating storage tanks to be connected according to requirements; the booster pump pressurizes the coating in the coating storage tank, then transports the coating to the spray gun 400 through the high-pressure hose, and finally the coating is sprayed to the target surface after releasing and instantaneous atomizing at the nozzle to form a coating layer so as to realize airless spraying.

Further, in order to facilitate the installation and maintenance of the coating storage tank and the circulation booster 600, a rotary table 510 is provided on the support, and four coating storage tanks are uniformly provided along the circumferential direction of the rotary table 510: when mounting or maintaining the coating storage tank and the circulation booster 600, the coating storage tank and the circulation booster 600 are mounted at a desired position by manually rotating the rotary table 510, or the coating storage tank to be maintained is rotated to a suitable position for maintenance. The rotary table 510 contributes to integrate all the coating systems such as the coating reservoir 500 and the circulation booster 600 into a limited space for easier installation and maintenance.

Further, the spray gun 400 may be a multi-chamber airless spray gun, the circulation booster 600 is connected with a corresponding coating storage tank, and the circulation booster 600 is connected with the multi-chamber airless spray gun through a pipeline; the multi-chamber airless spray gun, circulation booster 600 are all connected to the controller 700: the controller 700 controls the circulation booster 600 to activate so that the spray gun 400 is connected with the coating of the corresponding coating storage tank, and the multi-chamber airless spray gun is controlled to open the corresponding chamber so as to perform the spraying operation of the coating. By providing a plurality of circulation boosters 600 (in this embodiment, two circulation boosters 600 are provided) and a plurality of coating storage tanks (in this embodiment, four coating storage tanks are provided), each coating storage tank may store different coatings as required, and by working with the multi-chamber airless spray gun, the spray gun 400 can be easily connected with different coatings and perform the spraying operation of multiple coatings.

In order for a wider application range of spraying, an air compressor 610 is provided on the support, the air compressor 610 is connected with the controller 700, the air compressor 610 is connected with the spray gun 400, and the air compressor 610 provides compressed air for the spray gun 400: by providing compressed air to the spray gun 400 to atomize the coating, thus achieving a high-volume low-pressure spraying or air-assisted airless spraying, which makes uniform spraying quality and saves spraying material. However, during pure airless spraying, the air compressor 610 is not activated and does not provide compressed air to the spray gun 400.

Further, the coating storage tank may store coatings of different colors and can also store clear water, wherein the clear water can be used as one of the coatings and can also be used for cleaning the nozzle of the spray gun 400 to avoid the spray gun 400 being blocked by the coatings.

In order to facilitate the cleaning of the spray gun 400, an ultrasonic vibrator is provided on the movable base 100, a first clean groove 130 and a second clean groove are provided on the movable base 100, the first clean groove 130 is connected with the ultrasonic vibrator, clear water is provided in the first clean groove 130, and the ultrasonic vibrator is connected with the controller 700; no clear water is provided inside the second clean groove: before the spray gun 400 spraying, control the mechanical arm 300 to drive the spray gun 400 to extend into the second clean groove, the circulation booster 600 enables clear water stored in the coating storage tank to reach the spray gun 400 and clean the interior of the spray gun 400, and the waste water after cleaning is collected by the second clean groove; then, control mechanical arm 300 to drive the spray gun 400 to move into the first clean groove 130, and start the ultrasonic vibrator to clean the exterior of the spray gun 400 with the clean water in the first clean groove 130. Generally, the spray gun 400 performs the above cleaning process before spraying, and the spray gun 400 also performs the above cleaning process after spraying to avoid mutual contamination of different coatings of every two spraying, which affects the spraying effect, and also prevents the coating from blocking the spray gun 400.

In order to enable the surface-coating robot operating system to automatically coat a designated area to be sprayed, the surface-coating robot operating system further comprises a first 3D camera 710, a second 3D camera 720 and an absolute encoder, the first 3D camera 710 is provided on the bracket 210, the second 3D camera 720 is provided on the top of the movable base 100 at a certain inclination angle (specifically, the inclination angle of the second 3D camera 720 can be adjusted according to actual needs), and the first 3D camera 710, the second 3D camera 720 and the absolute encoder are all connected to the controller 700: the first 3D camera 710 captures local 3D data of the area to be sprayed when moving up and down along with the bracket 210 and feeds the data back to the controller 700, and the absolute encoder acquires a reading corresponding to the lifting motor and feeds the reading back to the controller 700; the second 3D camera 720 captures the 3D data of the top of the area to be sprayed, the crossing angle between the area to be sprayed and the top boundary at a certain inclination angle and feeds back the data to the controller 700; the controller 700 processes the received data to generate an operation track and controls the spray gun 400 to perform spraying operation. The first 3D camera 710, the second 3D camera 720 and the absolute encoder captures data of the area to be prayed, so that the spray gun 400 can precisely swing along a predetermined range and move along the concave-convex angle between the area to be prayed and the top boundary. By using a 3D camera, the robot can be operated in varying light and dark conditions.

In order to improve the endurance of the surface-coating robot operating system, the surface-coating robot operating system further comprises two rechargeable batteries 140, the rechargeable batteries 140 are provided in the movable base 100, and the rechargeable batteries 140 provide power for the whole surface-coating robot operating system; the rechargeable batteries 140 can be charged on-site, also it may be one rechargeable battery 140 being charged and one rechargeable battery 140 being used to ensure the normal spraying operation of the surface-coating robot operating system.

Further, the surface painting robot operating system may also use a computer aided control system to check the usage of the rechargeable battery 140 for activating an alarm or sending a message to a supervisory system and inform an operator.

Specifically, the controller 700 may be an industrial computer, and the controller 700 is connected to each structure through an ethernet or a device bus so as to implement data transmission and command control.

In order to improve the human-machine interaction capability of the surface-coating robot operating system, the surface-coating robot operating system further comprises a touch screen 150 provided on the movable base 100, the touch screen 150 is connected with the controller 700, an operator can input various instructions to the controller 700 through the touch screen 150, and the execution condition and various information of the surface-coating robot operating system can be displayed and fed back to the operator through the touch screen 150.

Further, a control human-machine interaction structure is provided on the movable base 100, the control human-machine interaction structure comprises a control rod 160 and a plurality of control buttons, the control rod 160 and the control buttons are both connected with the controller 700, an operator can manually control the surface-coating robot operating system to move to a designated position by controlling the control rod 160, and the operator inputs an instruction to the controller 700 through the control buttons.

In order to improve the interactivity of the surface-coating robot operating system, the surface-coating robot operating system may be further in communication connection with a hand-held terminal (such as a tablet personal computer, a mobile phone, and the like). Specifically, the controller 700 is communication connected to the hand-held terminal through ethernet (wired or wireless), and an operator may input commands to the controller 700 through the hand-held terminal, and the controller 700 feeds back information and commands to the hand-held terminal.

Figure 6:
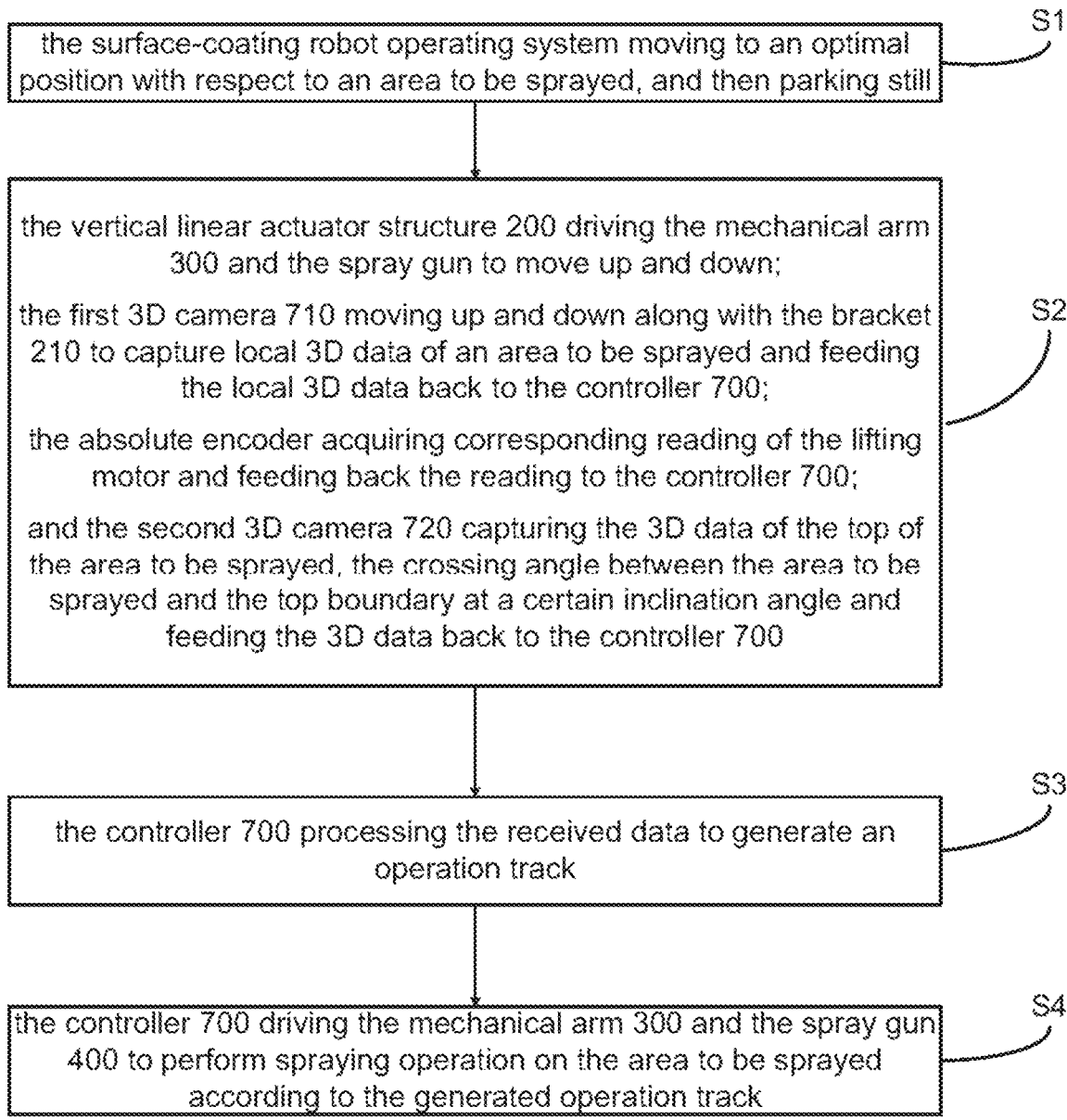
FIG. 6 is a flowchart illustrating the steps of a spraying method of the surface-coating robot operating system according to the present disclosure.

As shown in FIG. 6, a spraying method of the surface-coating robot operating system as described above specifically comprising the following steps:

S1, the surface-coating robot operating system moves to an optimal position with respect to an area to be sprayed, and parking still;

S2, the vertical linear actuator structure drives the mechanical arm 300 and the spray gun 400 to move up and down, the first 3D camera 710 moves up and down along with the bracket 210 to capture local 3D data of an area to be sprayed and feeds the local 3D data back to the controller 700, the absolute encoder acquires corresponding reading of the lifting motor and feeds back the reading to the controller 700, and the second 3D camera 720 captures the 3D data of the top of the area to be sprayed, the crossing angle between the area to be sprayed and the top boundary at a certain inclination angle and feeds the 3D data back to the controller 700;

S3, the controller 700 processes the received data to generate an operation track;

S4, the controller 700 drives the mechanical arm 300 and the spray gun 400 to perform spraying operation on the area to be sprayed according to the generated operation track.

In some embodiments, the specific procedures of step S3 is as follows: the controller 700 records and merges all local point clouds captured by the first 3D camera 710 and the second 3D camera 720, extracts the information of an area to be sprayed from other features by combining data fed back by the absolute encoder, and reconstructs a complete 3D model of the area to be sprayed near the surface-coating robot operating system; all the detected surfaces on the area to be prayed are classified according to the produced 3D model, and then a spraying coverage plan and an operation track of the spray gun 400 is generated.

According to the spraying requirement, the surface-coating robot operating system can implement the following modes of spraying: Mode 1: global spraying: it is a default setting (the surface-coating robot operating system typically performs the coating in the default setting if no special requirements are received). Mode 2: partial spraying (i.e. within an overall area to be sprayed, only a portion of the area to be sprayed may need spraying): once the operator selects this spray mode, the operator may select the area to be sprayed which needs spraying, the area to be sprayed which needs no spraying, or the area to be sprayed which needs spraying in different colors, otherwise the default setting of the surface-coating robot operating system is to spray the whole area to be sprayed. Generally, the surface-coating robot operating system implements a default coating mode (i.e., Mode 1), and the coating in Mode 2 is selected only in exceptional cases (e.g., a partial coating needs to be performed in the whole area to the sprayed, or multi-color spraying needs to be performed in the same area to the sprayed, etc.), but rarely will exceptional cases happen.

In some embodiments, the process of the spraying operation of the mechanical arm 300 and the spray gun 400 in step S4 is as follows: divide an area to be sprayed into a plurality of spraying pieces from top to bottom, and the spray gun 400 performs a spraying sequence from top to bottom: the spray gun 400 generates a horizontal spraying strip it spraying from left to right each time, and a spraying piece is formed when a certain number of horizontal spraying strips are provided in sequence from top to bottom: when the spray gun 400 finishes the spraying of one spraying piece, the vertical linear actuator structure 200 drives the spray gun to move down and continue to implement the spraying of the next spraying piece until the spraying of the whole area to be sprayed is completed.

In order to ensure the spraying effect, the spray gun 400 performs repetitive spraying for a certain number of times at the same horizontal spraying strips, that is, the spray gun 400 performs repetitive spraying for a plurality of times at the same horizontal spraying strips so as to ensure that the spraying reaches an accurate coating thickness.

In certain embodiments, the step S4 further comprising the following procedures: the spray gun 400 is adjustably positioned at an optimal distance and direction with respect to the area to be sprayed prior to spraying; the mechanical arm 300 implements a trapezoidal movement rule in the spraying process, that is, before the spray gun 400 performs spraying, when the mechanical arm 300 accelerates to a preset moving speed within a preset precise time, the mechanical arm 300 drives the spray gun 400 to move at a constant speed at the preset moving speed to start spraying, so that the spray gun 400 achieves the best spraying efficiency; when the spraying of the spray gun 400 is finished, turn off the spray gun 400, and the mechanical arm 300 starts to decelerate from the preset moving speed until the speed is 0.

Compared with the prior art, the present disclosure has the following advantages:

(1) The whole spraying process is automatically implemented by the surface-coating robot operating system, which saves time and labor, has high efficiency and shares a spraying speed being four times faster than that of a spraying or rolling mode.

(2) The movable base 100 may move and change direction in a plane, and the surface-coating robot operating system may move without difficulty by cooperating with the 2D laser scanner 730 and the eight distance measuring meters, so that the surface-coating robot operating system parks at an optimal distance and direction with respect to the area to be sprayed.

(3) The vertical linear actuator structure 200 drives the spray gun 400 to move up and down, so that the spray gun 400 may spray the area to be sprayed up to 3 m.

(4) Utilize an airless spraying with an air compressor 610, which may achieve a high-capacity low-pressure spraying or air-assisted airless spraying effect, and a more uniform spraying, which also saves spraying material and achieve better spraying effect.

(5) Perform repetitive spraying on each horizontal spraying strip for the same times, so that the whole spraying surface can reach an accurate coating thickness, which ensures precise and uniform thicknesses, uniformly distributed spraying surfaces, and excellent spraying quality.

(6) The first 3D camera 710, the second 3D camera 720 and the absolute encoder acquires the data of the wall to be sprayed, so as to reconstruct a complete 3D model of the structure of the area to be sprayed near the surface-coating robot operating system, so that the surface-coating robot operating system can autonomously realize perform according to the spraying track.

(7) The surface-coating robot operating system can be operated under the conditions of varying light and darkness by using the 3D camera and suitable for different working environments.

(8) The surface-coating robot operating system can obviously reduce coating dust generated by spraying in the spraying process, thereby reducing the risk of exposing human bodies to harmful coating chemicals.

(9) The precise positioning of the spray gun 400 improves the coating transfer efficiency by 20% compared to manual spraying.

(10) The surface-coating robot operating system has wide application range: suitable for use in autonomous spraying applications including but not limited to furniture, houses, office buildings and industrial plants, and suitable coatings comprise but not limited to paints, degreased coating, gypsum, concrete, water (referred to as cleaning operations).

In the description of the present specification, reference to the description of "one embodiment", "certain embodiments", "illustrative embodiments", "examples", "specific examples", or "some examples" or the like means that a particular feature, structure, material, or characteristic described in connection with the embodiment or example is included in at least one embodiment or example of the disclosure. In this specification, schematic representations of the above terms do not necessarily refer to the same embodiment or example. Furthermore, the particular features, structures, materials, or characteristics described may be combined in any suitable manner in any one or more embodiments or examples.

It will be understood that the disclosure is not limited to the examples described above, but that modifications and variations will occur to those skilled in the art in light of the above teachings, and that all such modifications and variations are considered to be within the scope of the disclosure as defined by the appended claims.

What is claimed is:

1. A surface-coating robot operating system, comprising:
    a movable base for supporting the whole surface-coating robot operating system and implementing movement;
    a vertical linear actuator structure provided on the movable base;
    a mechanical arm provided on the vertical linear actuator structure and able to move up and down along the vertical linear actuator structure, a spray gun is provided on the mechanical arm, and the spray gun is connected with coating;
    a controller provided in the movable base, and the controller controls automatic operations of the whole surface-coating robot operating system;
    the movable base, the vertical linear actuator structure, the mechanical arm and the spray gun is all connected with the controller and controlled by the controller: the movable base drives the whole surface-coating robot operating system to implement autonomous navigation movement in a working space; the vertical linear actuator structure drives the mechanical arm to move up and down according to a height of a spraying position so as to ensure the working area of the spray gun; and the mechanical arm drives the spray gun to implement multi-degree-of-freedom motion so that the spray gun may always perform coating operation at an optimal operation posture;
    the vertical linear actuator structure comprising a vertical linear actuator and a lifting motor; the vertical linear actuator comprising a ball screw vertically provided on the movable base, a bracket and nuts provided on the ball screw; the nuts and the bracket are fixedly connected and moves up and down along with the rotation of the ball screw; the mechanical arm is provided on the top of the bracket; the lifting motor is connected with the ball screw to drive the ball screw to rotate; and the lifting motor is connected with the controller; and,
    further comprising: a first 3D (three-dimensional) camera, a second 3D camera and absolute encoder, the first 3D camera is provided on the bracket, and the second 3D camera is provided on the top of movable base at a certain inclination angle, the first 3D camera, the second 3D camera and the absolute encoder are all connected with the controller: the first 3D camera captures local 3D data of the area to be sprayed when moving up and down along with the bracket and feeds the data back to the controller; and the absolute encoder acquires corresponding reading of the lifting motor and feeds the reading back to the controller; the second 3D camera captures the 3D data of the top of the area to be sprayed, the crossing angle between the area to be sprayed and the top boundary at a certain inclination angle and feeds the 3D data back to the controller; and the controller processes the received data to generate an operation track and controls the spray gun to perform spraying operation.

2. The surface-coating robot operating system according to claim 1, wherein, the movable base comprising a pedestal, a support provided on the pedestal and moving wheels set beneath the bottom of the pedestal, a power unit provided on the pedestal; the power unit is connected with the controller, a power output end of the power unit is connected with the moving wheels so as to drive the moving wheels to realize that the surface-coating robot operating system is movable and steerable in the plane; the vertical linear actuator structure provided on the pedestal; a coating reservoir, a circulation booster all provided on the support.

3. The surface-coating robot operating system according to claim 2, wherein, a 2D (two-dimensional) laser scanner is provided on the top of the movable base, the 2D laser scanner is used for measuring the distance and the direction between surface-coating robot operating system and the area to be sprayed; the 2D laser scanner is connected with the controller: in the moving process of the surface-coating robot operating system, the 2D laser scanner measures the distance and the direction between the surface-coating robot operating system and the area to be sprayed in real time and feeds the measured information back to the controller; and the controller controls the power unit to drive the surface-coating robot operating system to move to the optimal distance and direction with respect to the area to be sprayed according to feedback information so as to perform coating operation.

4. The surface-coating robot operating system according to claim 1, wherein, the mechanical arm is a six-axis joint mechanical arm or a seven-axis joint mechanical arm; a base of the mechanical arm is fixed on the vertical linear actuator structure; and the spray gun is provided at the tail end of the mechanical arm.

5. The surface-coating robot operating system according to claim 1, wherein, further comprising: at least one coating reservoir for storing coating and at least one circulation booster for circularly transporting the coating stored in the coating reservoir to the spray gun in a pressurizing manner; the coating reservoir, the circulation booster are all provided in the movable base; the coating reservoir for storing the coating utilizes a coating storage tank, and the spray gun utilizes a multi-chamber airless spray gun; both the circulation boosters and the multi-chamber airless spray gun are connected with the controller; the circulation booster are connected with the coating storage tank, the circulation booster are connected with the multi-chamber airless spray gun; the controller controls the circulation booster to activate and connect the corresponding coating storage tank; and the controller controls the multi-chamber airless spray gun to open the corresponding chamber to meet the different requirements of spraying.

6. The surface-coating robot operating system according to claim 5, wherein, one of the coating storage tanks is stored with clear water; the movable base is provided with ultrasonic vibrator, the movable base is provided with a first clean groove and a second clean groove, the first clean groove is connected with the ultrasonic vibrator, and the first clean groove is equipped with clear water; the ultrasonic vibrator is connected with the controller: prior to the spray gun performing spraying or posterior to the spraying, the mechanical arm is controlled to drive the spray gun to extend into the second groove, the circulation booster makes the clear water stored in the coating storage tank reaching the spray gun to clean the interior of the spray gun, and waste water after cleaning is collected by the second clean groove; and then, the mechanical arm is controlled to drive the spray gun to move into the first clean groove and start the ultrasonic vibrator to clean the exterior of the spray gun by cooperating with clean water in the first clean groove.

7. The surface-coating robot operating system according to claim 2, wherein, an automatic mechanical lock for locking the moving wheels is set at the bottom of the base, the automatic mechanical lock is connected to the controller, and the controller controls the automatic mechanical lock to lock or unlock the moving wheels: the surface-coating robot operating system is controlled to move to be parked at an optimal distance and direction with respect to the wall and perform spraying operation safely by the automatic mechanical lock locking the moving wheels.

8. The surface-coating robot operating system according to claim 1, wherein, two distance measuring meters for detecting the distance are set between the surface-coating robot operating system and obstacles respectively provided on four lateral-side surfaces of the movable base, and the distance measuring meters are connected with the controller: when the distance between the obstacles and the surface-coating robot operating system is smaller than predetermined values, the distance measuring meter feeds back information to the controller, and the controller controls the surface-coating robot operating system to avoid hitting the obstacles.

9. A surface-coating robot operating system, comprising:
 a movable base for supporting the whole surface-coating robot operating system and implementing movement;
 a vertical linear actuator structure provided on the movable base;
 a mechanical arm provided on the vertical linear actuator structure and able to move up and down along the vertical linear actuator structure, a spray gun is provided on the mechanical arm, and the spray gun is connected with coating;
 a controller provided in the movable base, and the controller controls the automatic operation of the whole surface-coating robot operating system;
the movable base, the vertical linear actuator structure, the mechanical arm and the spray gun is all connected with the controller and controlled by the controller: the movable base drives the whole surface-coating robot operating system to implement autonomous navigation movement in a working space; the vertical linear actuator structure drives the mechanical arm to move up and down according to the height of a spraying position so as to ensure the working area of the spray gun; and the mechanical arm drives the spray gun to implement multi-degree-of-freedom motion so that the spray gun may always perform coating operation at the optimal operation posture; and
 the vertical linear actuator structure further comprising an electromechanical lock for locking the vertical position of the bracket, and the electromechanical lock is connected to the controller.

10. A surface-coating robot operating system, comprising:
 a movable base for supporting the whole surface-coating robot operating system and implementing movement;
 a vertical linear actuator structure provided on the movable base;
 a mechanical arm provided on the vertical linear actuator structure and able to move up and down along the vertical linear actuator structure, a spray gun is provided on the mechanical arm, and the spray gun is connected with coating;
 a controller provided in the movable base, and the controller controls the automatic operation of the whole surface-coating robot operating system;
 the movable base, the vertical linear actuator structure, the mechanical arm and the spray gun is all connected with the controller and controlled by the controller: the movable base drives the whole surface-coating robot operating system to implement autonomous navigation movement in a working space; the vertical linear actuator structure drives the mechanical arm to move up and down according to the height of a spraying position so as to ensure the working area of the spray gun; and the mechanical arm drives the spray gun to implement multi-degree-of-freedom motion so that the spray gun may always perform coating operation at the optimal operation posture;
 the movable base comprising a pedestal, a support provided on the pedestal and moving wheels set beneath the bottom of the pedestal, a power unit provided on the pedestal; the power unit is connected with the controller, a power output end of the power unit is connected with the moving wheels so as to drive the moving wheels to realize that the surface-coating robot operating system is movable and steerable in the plane; the vertical linear actuator structure provided on the pedestal; a coating reservoir, a circulation booster all provided on the support; and
 a rotary table is provided on the support, and four coating reservoirs are uniformly provided along the circumferential direction of the rotary table: when mounting or maintaining the coating reservoirs and the circulation booster, the coating reservoirs and the circulation booster are mounted at a desired position by manually rotating the rotary table, or the coating reservoirs to be maintained is rotated to a suitable position for maintenance.

11. The surface-coating robot operating system according to claim 2, wherein, a liquid level sensor is provided in the coating reservoir, and the liquid level sensor is connected to the controller: the liquid level sensor detects the remaining amount of the liquid coating in the coating reservoir in real time and feeds back information to the controller for activating an alarm or sends a message to a supervisory system to inform an operator.

12. The surface-coating robot operating system according to claim 2, wherein, an air compressor is provided on the support, the air compressor is connected with the controller, the air compressor is connected with the spray gun, and the air compressor provides compressed air for the spray gun.

\* \* \* \* \*